US007875189B2

(12) United States Patent
Jaeger et al.

(10) Patent No.: US 7,875,189 B2
(45) Date of Patent: Jan. 25, 2011

(54) METHOD FOR SEPARATING SUSPENDED SOLID MATERIALS FROM AQUEOUS SYSTEMS WITH COLLOIDAL FLOCCULANTS

(75) Inventors: Werner Jaeger, Kleinmachnow (DE); Bernd-Reiner Paulke, Potsdam-Eiche (DE); Simona Schwarz, Radebeul (DE); Mandy Mende, Bannewitz (DE)

(73) Assignees: Fraunhofer-Gesellschaft zur Forderung der angewandten Forschung e.V., Munich (DE); Leibniz-Institut fur Polymerforschung Dresden e.V., Dresden (DE)

( * ) Notice: Subject to any disclaimer, the term of this patent is extended or adjusted under 35 U.S.C. 154(b) by 525 days.

(21) Appl. No.: 11/817,601

(22) PCT Filed: Mar. 3, 2006

(86) PCT No.: PCT/EP2006/001977

§ 371 (c)(1),
(2), (4) Date: Dec. 10, 2007

(87) PCT Pub. No.: WO2006/092328

PCT Pub. Date: Sep. 8, 2006

(65) Prior Publication Data

US 2008/0314840 A1    Dec. 25, 2008

(30) Foreign Application Priority Data

Mar. 3, 2005  (DE) ...................... 10 2005 009 808

(51) Int. Cl.
*C02F 1/56* (2006.01)
(52) U.S. Cl. ...................... 210/725; 210/734; 210/735; 524/922
(58) Field of Classification Search .................. 210/734
See application file for complete search history.

(56) References Cited

U.S. PATENT DOCUMENTS

| 3,739,948 | A | * | 6/1973 | Kontes ........................ 222/166 |
| 3,951,791 | A | * | 4/1976 | Huang et al. ................. 210/734 |
| 3,956,122 | A | * | 5/1976 | Coscia et al. ............... 210/734 |
| 3,994,806 | A | * | 11/1976 | Rausch et al. ............... 210/728 |
| 4,456,534 | A | * | 6/1984 | Lambert et al. ............. 210/725 |
| 4,931,191 | A | * | 6/1990 | Braden et al. ............... 210/725 |
| 5,093,009 | A | * | 3/1992 | Candau et al. .............. 210/734 |
| 5,429,749 | A | * | 7/1995 | Chung et al. ................. 210/734 |
| 5,961,839 | A | | 10/1999 | Simmsgeiger |
| 6,171,505 | B1 | * | 1/2001 | Maury et al. ................. 210/727 |
| 6,454,949 | B1 | | 9/2002 | Sesay et al. |
| 7,070,696 | B2 | | 7/2006 | Weir et al. |
| 2004/0124154 | A1 | | 7/2004 | Weir et al. |
| 2006/0124554 | A1 | | 6/2006 | Fechtenkotter et al. |

FOREIGN PATENT DOCUMENTS

| DE | 31030992 A | 2/1983 |
| WO | WO 00/01757 A1 | 1/2000 |
| WO | WO 2004/108601 A1 | 12/2004 |

OTHER PUBLICATIONS

Dautzenberg et al., *Polyelectrolytes: Formation, Characterization and Application*, 1994, 106-108 and 263-288, Hanser Publishers, Munich, Germany.
Kulicke et al., *Chem. Ing. Tech.*, 10:828-829 (1989).
Barany et al., *Advances in Colloid and Interface Science*, 111: 117-129 (2004).
Bertini et al., *J. Polym. Sci. Part A*, 25(10): 2665-2673 (Oct. 1987) Database Accession No. EIX88020016328; XP-002382622 (Abstract only).
Buchhammer et al., *Melliand Texilberichte*, 5: 391-394 (2001) XP001246770.
De Silva et al., *Colloids and Surfaces*, 50: 263-279 (1990).
Gudasheva et al., Chem. Technol. Fuels Oils, 11(9-10): 706-709 (Sep. 1975) Database Accession No. EIX76090003462; XP-002382620 (Abstract only).
Minakova et al., J. Appl. Chem. USSR, 59(5 Part 2): 1071-1073 (May 1986) Database Accession No. EIX87060088103; XP-002382621 (Abstract only).
Petzold et al., *Colloid & Polymer Science*, 276: 125-130 (1998).
Petzold et al., *Chemie Ingenieur Technik*, 74: 438-442 (2002) XP002382615.
English Translation of International Preliminary Report on Patentability for International Patent Application No. PCT/EP2006/001977.

* cited by examiner

*Primary Examiner*—Peter A Hruskoci
(74) *Attorney, Agent, or Firm*—Leydig, Voit & Mayer, Ltd.

(57) ABSTRACT

The invention relates to a method for separating suspended solid materials from aqueous systems, in which the latter is mixed with a flocculant made of polymer colloidal particles with cationic surface charge and subsequently the flocculated material is separated from the aqueous system.

13 Claims, No Drawings

METHOD FOR SEPARATING SUSPENDED SOLID MATERIALS FROM AQUEOUS SYSTEMS WITH COLLOIDAL FLOCCULANTS

The invention relates to a method for separating suspended solid materials from aqueous systems, in which the latter is mixed with a flocculant made of polymer colloidal particles with cationic surface charge and subsequently the flocculated material is separated from the aqueous system.

Separation of suspended solid materials, the size of which can be a few nm to several 100 µm is of substantial importance, not only for water treatment and waste water technology. In numerous commercial processes also, such as for instance paper production, this method step is an integral component of the respective process. The rational implementation of separation processes of this type requires the use of flocculants as auxiliary materials which here have attained technology-determining importance.

By means of the addition of flocculants, the fine-fragment particles of commercial slurries, as occur in numerous branches of the economy (water management, metal industry, paper industry, foodstuff production, ceramics industry, printing industry, biotechnology, pharmaceutical and cosmetic industry inter alia) can be combined into large-volume and rapidly sedimenting flakes and hence the effectiveness of mechanical solid-liquid separations are increased considerably ("Polyelectrolytes, Formation, Characterization, Application", Carl-Hanser-Verlag, Munich, 1994).

There can be used as flocculants in many cases also inorganic compounds such as salts of iron or aluminium. Under application conditions, these generally form large-volume flakes which enclose the material which is to be separated. A major disadvantage is that the quantities of inorganic salts used are comparatively high and consequently large volumes of sludge are formed. Most flocculation processes therefore use water-soluble organic polymers as flocculant. Both naturally occurring and synthetic polymers are thereby used. Natural polymers are predominantly based on starch as basic material and have the disadvantage that these flocculants are applicable mostly in comparatively large quantities and then only for a restricted number of processes.

Flocculants based on synthetic polymers have the advantage that they can be produced very specifically with respect to chemical structure and molecular parameters for the respective application case. This has led to the fact that a larger number of flocculants is available commercially. Generally these are cationic or anionic polyelectrolytes which vary with respect to the charge density, molecular weight and composition. Typical examples of cationic polyelectrolytes are the condensation products of dimethylamine and epichlorohydrin, poly(diallyldimethylammonium chloride) and the copolymers of acrylamide and quaternary esters or amides of acrylic acid or methylacrylic acid. A typical example of an anionic polyelectrolyte are copolymers of acrylamide and acrylic acid.

The polyelectrolytes used commercially as flocculant are linear macromolecules which, under application conditions, are molecularly dissolved. These polyelectrolytic flocculants can be used in very varied technologies. These include single-occasion or sequential addition of the polymers. Anionic and cationic polyelectrolytes can also be applied in one process one after the other. For most commercial separation methods, technologies which have been tried and tested in the meantime are available and a range of flocculation processes can be controlled successfully in a stable manner. This concerns for example communal waste water treatment and also production processes such as paper production.

In addition, particulate complexes of polycations and polyanions are also described as flocculants which are present as colloids (H.-M. Buchhammer, M. Oelmann, G. Petzold: Melliand Textilberichte 5 (2001) 391-394; G. Petzold, A. Nebel, H.-M. Buchhammer, K. Lunkwitz: Colloid Polym Sci 276 (1998) 125-130).

These colloids can carry both anionic and cationic charges. Via the production conditions of the particulate complexes, adjustment of the charge and also to a limited extent the size of these particles is effected. The comparatively greater requirement for polymer is disadvantageous, which up till now has prevented commercial application. In addition, the particle density is comparatively low, which likewise is disadvantageous for application as flocculent.

In the totality of flocculation processes however, two substantial deficiencies can still be perceived. On the one hand this concerns, in numerous commercially implemented methods, the width of the flocculation range (flocculation window), this is the range between minimum and maximum quantity of polyelectrolyte, the addition of which makes possible optimal separation. The larger this flocculation window, the less for example is the risk of restabilisation of the particles during charge reversal and the less reliably can the process be controlled. In practice, to date polyelectrolytes which are molecularly soluble in water and of varying charge density and molecular mass have been used exclusively and in the case of which polyelectrolytes this flocculation window is generally small (W.-M. Kulicke, Chemie-Ingenieur-Technik 61 (1989) 10).

Widening of the flocculation window would inter alia confer substantial advantages: minimisation of the influence of interference factors, such as pH change, variation of the ionic strength, variation of the solid material concentration.

In addition, there is a range of separation problems which to date have not been solved or not satisfactorily. This concerns:

suspensions which contain fine-fragment particles with small surface charge, suspensions with low solid material concentration, suspensions with high proportions of accompanying substances (surfactants, stabilisers, colourants, oils) which interfere with the separation process, concentrated suspensions (sludges) which contain particles with a very wide particle distribution and the fine proportion of which can only be separated with difficulty.

Typical examples are found in the slurries from microelectronics and also waste waters from the pharmaceutical-, foodstuff- and textile industry.

In order to be able to implement flocculation processes in a stable and reliable manner and to put into practice solid-liquid separations which to date could not be implemented commercially at all or not satisfactorily, the disadvantages of known materials and methods must be overcome.

The present invention is based on the underlying object of making available flocculants which, during flocculation, lead to wide flocculation windows and in addition alleviate the previously unsolved separation problems in the case of diluted or fine-fragment suspensions and also in the case of suspensions with high proportions of accompanying substances and with very wide particle size distribution. Likewise the set object is to eliminate the mentioned disadvantages of prior art.

This object is achieved by means of the method as disclosed herein. Additional uses according to the invention are indicated. The further advantageous developments are also disclosed.

According to the invention, a method for separating suspended solid materials from aqueous media is made available, in which the aqueous medium is mixed with a flocculant made of a polymer colloidal particle with cationic surface charge and subsequently the flocculated material is separated from the aqueous medium.

Preferably, colloidal particles are thereby used which are formed by emulsion copolymerisation of a hydrophobic vinyl monomer with a cationic vinyl monomer. The emulsion copolymerisation is thereby preferably implemented in the feed method. Production can however also be effected in the batch method.

Preferably colloidal particles are used which are formed from styrene and/or homologues thereof, e.g. 3,4-vinyltoluene or t-butylstyrene as hydrophobic monomers and N-methacryloyloxyethyl-N,N,N-trimethylammonium chloride (MADAM), N-methacryloyloxyethyl-N,N-dimethyl-N-benzylammonium chloride (MADAMBQ) and/or 4-vinylpyridine (4-VP) as cationic monomers.

With the flocculant according to the invention, the cationic surface charge is essential, the cationic surface charge being able to be both bonded to the particle surface directly or via a spacer.

Preferably the colloidal particles have a charge density of 5 $\mu C/cm^2$ to 35 $\mu C/cm^2$ and particularly preferred of 8 $\mu C/cm^2$ to 22 $\mu C/cm^2$.

The size of the colloidal particles according to the invention thereby is preferably from 50 to 1,000 nm, preferably from 100 to 150 nm.

For the separating method, quantities of flocculant are used which make possible, as a function of the aqueous medium, adequate separation of the suspended solid materials. Preferably 0.01 to 500 mg/1 g of suspended solid material are thereby used.

In an embodiment variant of the method according to the invention, the ionic strength of the aqueous medium is increased. This can be effected in particular by the addition of inorganic salts or changing the pH value of the aqueous medium. The method is therefore implemented preferably in a pH range of 1 to 14, and particularly preferred in a pH range of 3 to 9.

According to the invention, likewise the use of polymer colloidal particles with cationic surface charge is made available for separation of suspended solid materials from aqueous media. All the previously described flocculants which are based on the colloidal particles according to the invention are thereby included. In particular slurries from microelectronics and also waste water from the pharmaceutical-, foodstuff- and textile industry can be used as aqueous media.

With reference to the subsequent examples, the subject according to the invention is intended to be explained in more detail, without it necessarily being restricted to the special embodiments which are described here.

EXAMPLE 1

Production of Polymer Colloidal Particles with Cationic Surface Charge (styrene/MADAMBQ)

0.137 g borax and 0.12 g hexadecyltrimethylammonium bromide (CTAB) are dissolved in 156 ml purest water. The solution is added to a 250 ml double-walled glass reactor and agitated there with 14 g added styrene at 350/min into an emulsion. Now the reactor content is rinsed for 20 min with nitrogen. Subsequently heating to 60° and further rinsing thereby take place. After 10 min at 60° C., polymerisation is started by rapid supply of 2.4 g V-50 (2,2'-azo-bis-(2-amidinopropane)-dihydrochloride from Wako chemical), dissolved in 20 ml purest water, from a drip funnel. Simultaneously, pumping in of an aqueous comonomer solution to the polymerisation batch is begun. For this purpose, (1) 0.7 g or (2) 1.4 g or (3) 2.1 g or (4) 2.8 g or (5) 3.5 g 75% aqueous MADAMBQ solution (ATOCHEM) were diluted with purest water to 20 ml and filled into a corresponding injection syringe. The content is pressed uniformly over 2.2 h via the injection pump into the reactor (see latices no. 1—no. 5 in Table 1). After 6 h polymerisation time the latex is cooled and the nitrogen flow interrupted. The latex is filtered by means of a fine metal sieve and dialysed for pre-purification in Visking dialysis hoses (SERVA) against deionised water for 3 days. The fine purification is effected by means of ultrafiltration in agitated 400 ml cells (Berghof) over nuclear track membranes (Whatman) with 100 nm diameter of the cylinder pores.

Molar concentration data (in mol per litre of water, with 0.196 l water):

Borax $1.83*10^{-3}$ mol/l, CTAB $1.68*10^{-3}$ mol/l, styrene 0.685 mol/l, V-50 $4.52*10^{-2}$ mol/l, MADAMBQ 1) $9.44*10^{-3}$ mol/l, 2) $1.88*10^{-2}$ mol/l, 3) $2.83*10^{-2}$ mol/l, 4) $3.76*10^{-2}$ mol/l, 5) $4.72*10^{-2}$ mol/l.

EXAMPLE 2

Styrene/MADAM

Corresponding method-wise to example 1, MADAM was used as cationic comonomer. Additions of the MADAM solution (75%) in 20 ml purest water via the injection pump: (6) 0.52 g or (7) 1.04 g or (8) 1.56 g or (9) 2.08 g or (10) 2.60 g—latices no. 6—no. 10 in Tab. 1.

EXAMPLE 3

Styrene/4-vinylpyridine

Corresponding method-wise to example 1, 4-VP was used as cationic comonomer. Additions of vinylpyridine in 20 ml purest water via the injection pump: (11) 0.195 g or (12) 0.389 g or (13) 0.585 g or (14) 0.78 g or (15) 0.975 g—latices no. 11—no. 15 in Tab. 1.

Characterisation: the latex particles were examined with respect to their size and their surface charge. Determination of the particle size distribution was effected by means of dynamic light scattering (BI-90 or FOQELS/Brookhaven Inc.). Titration of the surface charge density was effected with a combination of a particle charge detector (PCD-03 pH/MÜTEK) and an autotitrator (Titrino 716/Metrohm). With series of measurements of the electrophoretic mobility with increasing ionic strength it could be proved that the surface of the particles advantageously used for flocculation is not smooth but rather is hairy. Most of the charges are situated on the water-soluble polymer chains which protrude into the surrounding, aqueous medium. (Zetamaster S/Malvern Instruments)

Table 1 contains a compilation of synthesised cationic latex particles.

TABLE 1

| Matrix monomer | Comonomer in the feed | | | | | | | | |
|---|---|---|---|---|---|---|---|---|---|
| | → MADAMBQ | | | → MADAM | | | → 4-vinylpyridine | | |
| | No. | D [nm] | LD [µC/cm²] | No. | D [nm] | LD [µC/cm²] | No. | D [nm] | LD [µC/cm²] |
| Styrene | 1 | 149.3 | 8.0 | 6 | 131 | 6.5 | 11 | 177 | 3.8 |
| Styrene | 2 | 117.5 | 10.7 | 7 | 129 | 9.2 | 12 | 156 | 6.2 |
| Styrene | 3 | 111.3 | 17.0 | 8 | 126 | 11.1 | 13 | 138 | 8.3 |
| Styrene | 4 | 130.2 | 15.1 | 9 | 127 | 13.7 | 14 | 143 | 9.9 |
| Styrene | 5 | 114.2 | 21.6 | 10 | 124 | 15.4 | 15 | 151 | 11.7 |

EXAMPLE 4

Flocculation of Suspensions

Flocculation was tracked by measuring the optical density (OD) of the aqueous systems to be assessed at 500 nm ($OD_{500}$) by means of a UV/VIS spectrometer Lambda 900 (Perkin-Elmer). Flocculation is considered good when the residue is clear. Optically clear residues were achieved at $OD_{500}$ values equal to or smaller than 0.3.

Different volumes of the respective cationic latices (solid material content 4.2-5.4%) were added to 50 ml of a stable silica suspension (10 g/l) in water at pH 10 with agitation (JAR test unit). After a sedimentation time of 1 hour, samples of the residue were removed and the optical density measured. The flocculation window (optimal flocculation range with clear residue) was determined as a ratio of mg latex to substrate concentration. The results are compiled in Table 2.

TABLE 2

Flocculation of silica with cationic latices

| Latex no. | Flocculation window mg/g |
|---|---|
| 1 | 110-170 |
| 2 | 60-80 |
| 3 | 10-25 |
| 4 | 8-25 |
| 5 | 2-9 |
| 6 | 120-170 |
| 7 | 70-90 |
| 8 | 50-70 |
| 9 | 10-30 |
| 10 | 7-25 |
| 11 | 150-210 |
| 12 | 130-190 |
| 13 | 70-100 |
| 14 | 60-90 |
| 15 | 40-65 |

EXAMPLE 5

A dispersion colourant with low charge and low solid material content of 80 mg/l was dispersed in water. Different volumes of a cationic latex of no. 5 were added to 50 ml of this colourant dispersion with agitation, the subsequent agitation time being 15 min. After a sedimentation time of 1 hour, samples of the residue were removed and the optical density measured. The residue was clear and completely colourless. The flocculation window at $C_{colourant}/C_{polymer}$ of 20 mg/l without restabilisation was in the examined range up to 200 mg/l.

COMPARISON EXAMPLE

A dispersion colourant with low charge and low solid material content of mg/l was treated correspondingly method-wise to example 3 with commercial cationic polyacrylamides. There was no success in achieving flocculation without heavy residual colouration remaining.

The invention claimed is:

1. A method for separating suspended solid materials from an aqueous medium comprising mixing the aqueous medium with a flocculant made of a polymer colloidal particles with cationic surface charge to obtain a flocculated material and subsequently separating the flocculated material from the aqueous medium, wherein
the colloidal particles are formed by emulsion copolymerisation of one or more hydrophobic vinyl monomers with one or more cationic vinyl monomers,
wherein the emulsion copolymerisation is implemented in a feed method wherein the one or more cationic vinyl monomers are fed in a continuous manner,
wherein the charge density of the colloidal particles is from 5 µC/cm² to 35 µC/cm² and the size of the colloidal particles is from 50 nm to 1,000 nm, and wherein the one or more hydrophobic vinyl monomers are styrene and/or a homologue thereof, the one or more cationic vinyl monomers are N-methacryloyloxyethyl-N,N,N-trimethylammonium chloride, N-methacryloyloxyethyl-N,N-dimethyl-N-benzylammonium chloride and/or 4-vinylpyridine, and the cationic surface charge is bonded to the particle surface directly or via a spacer.

2. The method according to claim 1, wherein the size of the colloidal particles is from 100 nm to 150 nm.

3. The method according to claim 2, wherein the charge density of the colloidal particles is from 8 µC/cm² to 22 µC/cm².

4. The method according to claim 1, wherein the flocculant is mixed in an amount of 0.01 to 500 mg per 1 g of suspended materials.

5. The method according to claim 1, which includes increasing the ionic strength of the aqueous medium.

6. The method of claim 5, wherein the ionic strength of the aqueous medium is increased by adding an inorganic salt to the aqueous medium.

7. The method of claim 5, wherein the ionic strength of the aqueous medium is increased by changing its pH value.

8. The method according to claim 1, wherein the pH of the aqueous medium is 1 to 14.

9. The method of claim 8, wherein the pH of the aqueous medium is 3 to 9.

10. The method according to claim 1, wherein the aqueous medium is a slurry from microelectronics or a waste water from a pharmaceutical industry, a food stuff industry, or a textile industry.

11. The method of claim 1, wherein the homologue of styrene is 3,4-vinyltoluene or t-butylstyrene as hydrophobic monomers.

12. The method of claim 1, wherein the charge density of the colloidal particles is from 8 $\mu C/cm^2$ to 22 $\mu C/cm^2$.

13. A method for separating suspended solid materials from an aqueous medium comprising mixing the aqueous medium with a flocculant made of a polymer colloidal particles with cationic surface charge to obtain a flocculated material and subsequently separating the flocculated material from the aqueous medium, wherein the colloidal particles are formed by emulsion copolymerisation of one or more hydrophobic vinyl monomers with one or more cationic vinyl monomers, wherein the charge density of the colloidal particles is from 5 $\mu C/cm^2$ to 35 $\mu C/cm^2$ and the size of the colloidal particles is from 50 nm to 1,000 nm, and wherein the one or more hydrophobic vinyl monomers are styrene and/or a homologue thereof, the one or more cationic vinyl monomers are N-methacryloyloxyethyl-N,N,N-trimethylammonium chloride, N-methacryloyloxyethyl-N,N-dimethyl-N-benzylammonium chloride and/or 4-vinylpyridine, and the cationic surface charge is bonded to the particle surface directly or via a spacer.

* * * * *